United States Patent Office 2,909,211
Patented Oct. 20, 1959

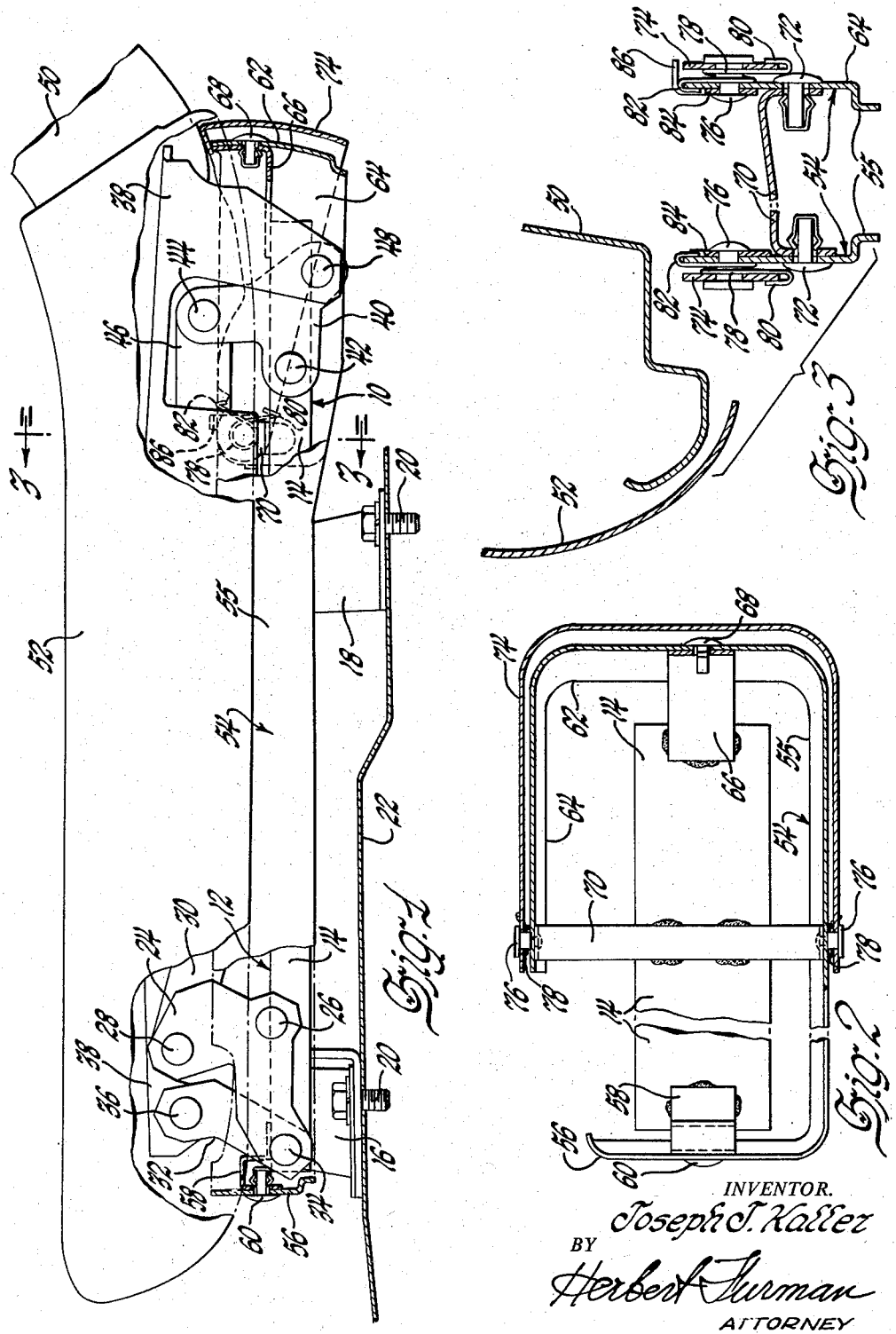

2,909,211

COVER ASSEMBLY FOR VEHICLE SEAT ADJUSTING MECHANISM

Joseph J. Kaller, Detroit, Mich., assignor to General Motors Corporation, Detroit, Mich., a corporation of Delaware Application July 28, 1958, Serial No. 751,341

10 Claims. (Cl. 155—14)

This invention relates to covers for vehicle seat adjusting mechanisms and more particularly to cover assemblies for vehicle seat adjusting mechanisms of the type which are adjustable in both horizontal and vertical directions.

Since the adjusting mechanisms are vertically adjustable and are usually used for vehicle front seats, it is possible for a rear seat passenger to accidentally place his foot or a portion thereof within the adjusting mechanism where it may be injured upon subsequent operation of the adjusting mechanism.

In order to prevent any such possibility of injury to a rear seat passenger, this invention provides a cover assembly for the seat adjusting mechanism which prevents a rear seat passenger from accidentally placing his foot within the seat adjusting mechanism. The cover assembly further conceals the seat adjusting mechanism from view from both the front and rear of the seat and cooperates with the usual seat side panel cover in concealing the mechanism from view from the side of the seat, regardless of the horizontal or vertical position of the seat.

The cover assembly of this invention is particularly intended for use with vehicle seat adjusting mechanisms of the type wherein the horizontal adjusting means supports the vertical adjusting means and the vertical adjusting means in turn supports the vehicle seat. The cover assembly includes a first cover member which is supported by the upper track or slide member of the horizontal adjusting means in overlapping relationship to the seat side panel cover. This cover member wraps around both the front and rear ends of the horizontal adjusting means to conceal this adjusting means and a portion of the vertical adjusting means from view from the side, the front, and the rear of the seat, and cooperates with the seat side panel cover in completely concealing the adjusting means from view from the side of the seat. This first cover member has a sufficient length to permit movement of the upper track or slide member relative to the fixed lower track or slide member without interference. A second U-shaped cover member is pivotally supported on the first cover member at the rear thereof in overlapping relationship to the rear wrap around portion of the first cover member. The second cover member is spring biased in an upward direction so that it continually engages the vehicle seat. Thus should the vehicle seat be vertically adjusted, whereby the seat will be moved vertically upwardly away from the horizontal adjusting means and the first cover member, the second cover member will follow this movement of the seat and the overlapping relationship of the second cover member to the first cover member effectively prevents any rear seat passenger from inserting his foot between the seat and the horizontal seat adjusting means.

The primary object of this invention is to provide an improved cover for seat adjusting mechanisms. Another object of this invention is to provide an improved cover assembly for vehicle seat adjusting mechanisms of the type which are adjustable in both horizontal and vertical directions. A further object of this invention is to provide an improved cover assembly for vehicle seat adjusting mechanisms adjustable in both horizontal and vertical directions wherein the cover assembly conceals the seat adjusting mechanism from view regardless of the position of the vehicle seat and further effectively prevents a passenger from accidentally inserting his foot within the adjusting mechanism to thereby prevent possible injury to the passenger.

These and other objects of this invention will be more readily apparent from the following specification and drawings, wherein:

Fig. 1 is a side elevational view of a vehicle seat and seat adjusting mechanism embodying a cover assembly according to this invention, with parts thereof broken away for clarity of illustration;

Figure 2 is a top plan view of the cover assembly and a portion of the seat adjusting mechanism; and Figure 3 is a sectional view taken along the plane indicated generally by line 3—3 of Figure 1.

Referring now particularly to Figure 1 of the drawings, a vehicle seat adjusting mechanism 10 generally includes a seat slide assembly 12 having an upper seat slide or track member 14 slidably supported on a lower track member, not shown, for horizontal fore and aft movement relative thereto and operated by suitable operating means. The lower track member is fixed to front and rear support brackets 16 and 18, respectively, which are bolted at 20 to the vehicle floor pan 22 in order to fixedly mount the seat slide assembly on the body. The vertical adjusting means is supported by the upper track 14 of the seat slide assembly 12 adjacent the front and rear ends thereof. The front vertical adjusting means generally includes a bell crank member 24 which is pivotally supported on the upper track 12 at 26 and is pivotally connected at 28 to an operating link 30. An adjusting link 32 is pivoted to the bell crank at 34 and at 36 to the seat support channel 38. The rear vertical adjusting means generally includes a bell crank 40 which is pivoted at 42 to the upper track 14 of the seat slide assembly and at 44 to an operating link 46. The bell crank 40 is further connected at 48 to the seat support channel 38.

The seat adjusting mechanism 10 may either be of the four-way or six-way type. If the mechanism 10 is of the four-way type, then the links 30 and 46 will be connected to suitable operating means for simultaneous vertical adjustment of the front and rear portions of the seat and, if the mechanism is of the six-way type, then the links 30 and 46 will be connected to suitable operating means for selective vertical adjustment of the front and rear portions of the seat. The subject invention will work equally well with either a four-way or a six-way type of seat adjusting mechanism providing, of course, that the vertical adjusting means is supported on the horizontal adjusting means, as previously mentioned. Since the specific details of the seat adjusting mechanism 10 are not necessary to an understanding of this invention, they are not shown herein. However, for complete details of a similar six-way type seat adjusting mechanism, reference may be had to the copending application S.N. 752,080, Tanaka et al., filed July 30, 1958, and assigned to the assignee of this invention. Briefly, however, upon movement of the link 30 rearwardly of the seat or to the right, as viewed in Figure 1, the bell crank 24 will be swung clockwise about its pivot 26 to raise the front portion of the support channel 38 by means of the link 32, and upon movement of the link 46 forwardly of the seat or to the left, as viewed in Figure 1, the bell crank 40 will be swung counter-clockwise about its pivot 42 to raise the rear portion of the seat support channel 38. Likewise, it will be understood that the upper track 14 may be moved either forwardly or rearwardly, either to the left or to the right, as viewed in Figure 1, in order to selectively adjust the seat in horizontal directions.

The seat support channel 38 is secured in a suitable manner to the front seat frame 50 which supports the seat cushion and seat back members as is conventional. The seat frame 50 also supports a conventional seat side panel cover 52 which surrounds the side edge portion of the seat frame 50 to conceal this portion from view and thereby provide a decorative effect to the vehicle seat.

It can be seen that the seat slide assembly 12 is visible regardless of the horizontal or vertical position of the seat and that at least portions of the front and rear vertical adjusting means are visible even if the seat is in its lowermost vertical position, as shown in the drawings. It will be further noted that if the rear portion of the seat is in a raised vertical position, it is possible for a rear seat passenger to accidentally place his foot between the seat frame 50 and the upper track 14 of the seat slide assembly so that there is a possibility of injury to his foot if the rear portion of the seat is thereafter lowered. It is also possible, of course, for the passenger to accidentally insert his foot between the bell crank 40 and the upper track 14 if the seat is in a raised vertical position. In order to entirely conceal the seat adjusting mechanism from view regardless of the horizontal and vertical position of the seat, and further in order to effectively prevent any injury to the foot of a rear seat passenger, this invention provides a cover assembly for the seat which will now be described. The cover assembly includes a first cover member 54 having a portion 55 located outboard of the slide assembly 12 and vertical adjusting means but inboard of cover 52. Member 54 also includes a front wrap around portion 56 which wraps around the front end of the slide assembly 12 in order to conceal the slide assembly from view from the front of the seat. The portion 56 of the cover member is secured to the upper track 14 of the slide assembly by an angle bracket 58 which is welded to the upper track adjacent its forward end and is bolted at 60 to the portion 56. As best shown in Figure 2 of the drawings, the cover member 54 further includes a rear wrap around portion 62 which wraps around the rear end of the slide assembly 12 and includes a leg 64 extending forwardly of the seat inboard of the seat slide assembly and the vertical seat adjusting means. The rear portion of the cover member 54 is secured to the upper track 14 of the seat slide assembly by an angle bracket 66 which is welded to the upper track and bolted at 68 to the portion 62.

A generally U-shaped bracket 70 extends between the leg 64 and the portion 55 of cover 54 and is bolted thereto at 72, Figure 3, in order to stabilize the forwardly extending leg 64 of the cover member. The bracket 70 is further welded to the upper track 14, as can be seen in Figure 2, in order to further fixedly mount the cover member 54 on the seat slide assembly.

The cover assembly further includes a second cover member 74 which is of generally U-shape and is located in overlapping relationship to the rear portion 62, the forwardly extending leg 64 and the rear portion of the longitudinally extending portion 55 of the cover member 54, as best shown in Figure 2. The second cover member 74 is swingably mounted on the first cover member 54 by means of a pair of transversely aligned studs 76 which are fixed to the first cover member and are pivotally received by the second cover member. A coil torsion spring 78 is mounted on each of the studs 76 between the first and second cover members, with one leg 80 of each of the springs being hooked under the second cover member and the other leg 82 of the springs being hooked over the first cover member to continually bias the second cover member in an upward direction or out of overlapping relationship to the first cover member whereby the second cover member is continually biased into engagement with the seat frame 50, as can be seen in Figure 1. A washer 84 is provided for each of the studs between the head of the stud and the cover member 54, best shown in Figure 3, with the inboard washer 84 being provided with a bent over tab 86 which is engageable by the upper edge of the second cover member 74 to limit upward swinging movement of the second cover member against the action of the spring 78.

It can be seen from Figure 1 of the drawings that the first cover member 54 cooperates with the seat side panel cover 52 in concealing the seat slide assembly 12 and the front and rear vertical adjusting means from view from the side of the seat, and that the forward wrap around portion 56 of the first cover member further conceals the front vertical adjusting means from view from the front of the seat. The rear vertical adjusting means is concealed from view by both the first and second cover members whereby regardless of the horizontal or vertical position of the seat, the seat slide assembly and the front and rear vertical adjusting means are completely concealed from view. It will further be noted that if the second cover member 74 were not provided, it would be possible for a rear seat passenger to accidentally place his foot between the seat frame 50 and the upper track or between the bell crank 40 and the upper track when the seat is in raised position so that his foot might thereafter be injured if the seat is lowered. Since the second cover member 74 is continually biased into engagement with the seat frame 50, this cover member effectively prevents any such accidental placing of the foot of the rear seat passenger in a dangerous position in all vertical positions of the seat.

Thus this invention provides a new and improved cover assembly for vehicle seat adjusting mechanisms of the type which are adjustable in both horizontal and vertical directions. The cover assembly of this invention conceals the entire seat adjusting mechanism from view to increase the aesthetic appearance of the seat and additionally prevents any injury to the feet of a rear seat passenger should the passenger accidentally place his feet within the adjusting mechanism or between the adjusting mechanism and the seat, and the seat thereafter be adjusted.

What is claimed is:

1. The combination comprising, a vehicle seat, means for selectively adjusting said seat in both horizontal and vertical directions, a first cover member supported by said adjusting means in longitudinal relationship to said seat for concealing said adjusting means, a second cover member, means mounting said second cover member on said adjusting means for vertical movement relative to said first cover member, and means continually biasing said second cover member vertically into engagement with said seat in all vertical positions thereof relative to said first cover member.

2. The combination comprising, a vehicle seat, means for selectively adjusting said seat in both horizontal and vertical directions, a first cover member supported by said adjusting means in longitudinal relationship to said seat for concealing said adjusting means, a second cover member, means swingably mounting said second cover member on said adjusting means in overlapping relationship to said first cover member for horizontal movement therewith and vertical swinging movement relative thereto, and means continually biasing said second cover member out of overlapping relationship with said first cover member and into engagement with said seat in all vertical positions thereof.

3. The combination comprising, a vehicle seat, means for selectively adjusting said seat in both horizontal and vertical directions, a first cover member supported by said adjusting means in longitudinal relationship to said seat for concealing said adjusting means, a second cover member, means pivotally mounting said second cover member on said first cover member in overlapping relationship therewith for vertical swinging movement relative thereto, and means biasing said second cover member in a vertically upward direction into engagement with said seat in all vertical positions thereof.

4. The combination comprising, a vehicle seat, seat adjusting means disposed below said seat adjacent a side edge thereof for selectively adjusting said seat in horizontal and vertical directions, a first cover member extending longitudinally of the side edge of said seat and located therebelow to one side of said adjusting means, means mounting said first cover member on said seat adjusting means generally longitudinally of said seat, a second cover member, means mounting said second cover member on said seat adjusting means in overlapping relationship to said first cover member for vertical movement relative thereto, and means continually biasing said second cover member upwardly into engagement with said seat in all vertically adjusted positions thereof relative to said first cover member.

5. The combination comprising, a vehicle seat, seat adjusting means disposed below said seat adjacent a side edge thereof for selectively adjusting said seat in horizontal and vertical directions, a first cover member extending longitudinally of the side edge of said seat and located therebelow to one side of said adjusting means, said first cover member including a wrap around portion extending around one end of said adjusting means to the other side thereof, means mounting said first cover member on said seat adjusting means, a second cover member, means mounting said second cover member, on said seat adjusting means in overlapping relationship to said wrap around portion of said first cover member for vertical movement relative thereto, and means continually biasing said second cover member upwardly into engagement with said seat in all vertically adjusted positions thereof relative to said first cover member whereby said first and second cover members cooperatively prevent access to said one end of said adjusting means in all vertically adjusted positions of said seat.

6. The combination comprising, a vehicle seat, seat adjusting means disposed below said seat adjacent a side edge thereof for selectively adjusting said seat in horizontal and vertical directions, a longitudinally extending seat side panel cover secured to said seat adjacent the side edges thereof and extending therebelow in partial concealing relationship to said seat adjusting means, a first longitudinally extending cover member supported by said adjusting means outwardly thereof and in overlapping relationship to said seat side panel cover whereby said seat side panel and said first cover member cooperatively conceal said adjusting means from view from the side of said seat in all horizontal and vertically adjusted positions thereof, said first cover member including a wrap around portion extending around one end of said adjusting means to the other side thereof, a second cover member, means swingably mounting said second cover member on said first cover member in overlapping relationship to said wrap around portion thereof for vertically swinging movement relative thereto, and means continually biasing said second cover member into engagement with said seat in all vertical positions thereof whereby said first and second cover members cooperatively conceal said adjusting means from view from said one end thereof and prevent access to said one end of said seat adjusting means in all horizontal and vertically adjusted positions of said seat.

7. The combination comprising, a vehicle body, a vehicle seat located within said body, selectively operable horizontal seat adjusting means mounted on said body and disposed below said seat adjacent a side edge thereof, selectively operable vertical seat adjusting means supported by said horizontal seat adjusting means and operatively connected to said seat for mounting said seat on said horizontal and vertical adjusting means for selective horizontal and vertical adjustment, a first cover member extending generally longitudinally of the side edge of said seat and located therebelow outwardly of said seat adjusting means, said cover member including a wrap around portion extending around one end of said horizontal adjusting means to the inner side thereof, means fixedly mounting said first cover member on said horizontal seat adjusting means, a second cover member, means swingably mounting said second cover member on said first cover member in overlapping relationship to said wrap around portion thereof for vertically swinging movement relative thereto, and means biasing said second cover member into engagement with said seat in all vertically adjusted positions thereof whereby said first and second cover members cooperatively conceal said adjusting means from view from said one end thereof and prevent access to said one end of said adjusting means in all horizontal and vertically adjusted positions of said seat.

8. The combination comprising, a vehicle body, a vehicle seat located within said body, selectively operable horizontal seat adjusting means mounted on said body and disposed below said seat adjacent a side edge thereof, selectively operable vertical seat adjusting means supported by said horizontal seat adjusting means and operatively connected to said seat for mounting said seat on said horizontal and vertical adjusting means for selective horizontal and vertical adjustment, a seat side panel cover secured to said seat adjacent a side edge thereof and extending therebelow, a first cover member extending generally longitudinally of the side edge of said seat and located therebelow in overlapping relationship to said side panel cover and outwardly of said seat adjusting means, said cover member including a wrap around portion extending around one end of said horizontal adjusting means to the inner side thereof, means fixedly mounting said first cover member on said horizontal seat adjusting means, a second cover member, means swingably mounting said second cover member on said first cover member in overlapping relationship to said wrap around portion thereof for vertically swinging movement relative thereto, and means biasing said second cover member into engagement with said seat in all vertically adjusted positions thereof whereby said first and second cover members cooperatively conceal said adjusting means from view from said one end thereof and prevent access to said one end of said adjusting means in all horizontal and vertically adjusted positions of said seat.

9. The combination comprising, a vehicle body, a vehicle seat located within said body, selectively operable horizontal seat adjusting means mounted on said body and disposed below said seat adjacent a side edge thereof, selectively operable vertical seat adjusting means supported by said horizontal seat adjusting means and operatively connected to said seat for mounting said seat on said horizontal and vertical adjusting means for selective horizontal and vertical adjustment, a seat side panel cover secured to said seat adjacent a side edge thereof and extending therebelow, a first cover member extending generally longitudinally of the side edge of said seat and located therebelow in overlapping relationship to said side panel cover and outwardly of said seat adjusting means, said cover member including a wrap around portion extending around one end of said horizontal adjusting means and longitudinally thereof to the inner side thereof, means fixedly mounting said first cover member on said horizontal seat adjusting means, a generally U-shaped second cover member, means swingably mounting said second cover member on said first cover member in overlapping relationship to a portion thereof and said wrap around portion thereof for vertically swinging movement relative thereto, and means biasing said second cover member into engagement with said seat in all vertically adjusted positions thereof whereby said first and second cover members cooperatively conceal said adjusting means from view from said one end thereof and prevent access to said one end of said adjusting means in all horizontal and vertically adjusted positions of said seat.

10. The combination comprising, a vehicle seat, means for selectively adjusting said seat in vertical directions, a first cover member supported by said adjusting means in overlying relationship thereto for concealing said means, a second cover member, means mounting said second cover member on said adjusting means for vertical movement relative to said first cover member, and means holding said second cover member in engagement with said seat in all vertical positions of said seat relative to said first cover member.

References Cited in the file of this patent

UNITED STATES PATENTS 2,809,688     Brundage _____ Oct. 15, 1957